United States Patent
Aida et al.

(10) Patent No.: US 7,622,206 B2
(45) Date of Patent: Nov. 24, 2009

(54) SILICON SUBSTRATE FOR MAGNETIC RECORDING MEDIUM AND MAGNETIC RECORDING MEDIUM

(75) Inventors: Katsuaki Aida, Ichihara (JP); Hiroyuki Machida, Ichihara (JP); Kazuyuki Haneda, Ichihara (JP)

(73) Assignee: Showa Denko K.K., Tokyo (JP)

( * ) Notice: Subject to any disclaimer, the term of this patent is extended or adjusted under 35 U.S.C. 154(b) by 218 days.

(21) Appl. No.: 11/662,493

(22) PCT Filed: Sep. 16, 2005

(86) PCT No.: PCT/JP2005/017564

§ 371 (c)(1),
(2), (4) Date: Mar. 15, 2007

(87) PCT Pub. No.: WO2006/030986

PCT Pub. Date: Mar. 23, 2006

(65) Prior Publication Data

US 2008/0088973 A1    Apr. 17, 2008

Related U.S. Application Data

(60) Provisional application No. 60/614,460, filed on Oct. 1, 2004.

(30) Foreign Application Priority Data

Sep. 17, 2004 (JP) ............................ 2004-271628
Apr. 19, 2005 (JP) ............................ 2005-120995

(51) Int. Cl.
*G11B 5/82* (2006.01)
*G11B 5/73* (2006.01)
(52) U.S. Cl. .................... 428/846.1; 428/848.6; 451/36

(58) Field of Classification Search .............. 428/64.3, 428/64.4, 846, 846.1, 846.9, 848.6, 848.8; 360/135, 138; 451/36; 438/680; 65/102
See application file for complete search history.

(56) References Cited

U.S. PATENT DOCUMENTS 6,096,405 A    8/2000    Takahashi et al.

(Continued)

FOREIGN PATENT DOCUMENTS

CN         1178361 A         9/1997

(Continued)

*Primary Examiner*—D. Lawrence Tarazano
*Assistant Examiner*—Louis Falasco
(74) *Attorney, Agent, or Firm*—Sughrue Mion, PLLC

(57) ABSTRACT

To provide a substrate which is not substantially chipped or cracked on the substrate end faces even when the substrate is a silicon substrate made of a brittle material, and provide a substrate which prevents dust raising from the substrate end faces and prevents dust raising due to rubbing with a processing cassette.

A silicon substrate for a magnetic recording medium is formed by setting the lengths L of chamfered portions between the main surfaces of the substrate and the outer circumferential side end face to 0.1±0.03 mm and setting the angles α between the main surfaces and the chamfered portions between the main surfaces and the outer circumferential side end face to 45 degrees ±5 degrees. It is also possible for a curved portion with a radius of 0.01 mm or more and less than 0.3 mm is interposed between the main surfaces and the outer circumferential side chamfered portions of the substrate.

5 Claims, 3 Drawing Sheets

U.S. PATENT DOCUMENTS

| | | |
|---|---|---|
| 6,280,294 B1 * | 8/2001 | Miyamoto .................... 451/34 |
| 6,309,290 B1 * | 10/2001 | Wang et al. .................. 451/398 |
| 6,595,831 B1 * | 7/2003 | Hirokawa et al. ............. 451/36 |
| 6,997,019 B2 * | 2/2006 | Kawata et al. ................ 65/102 |
| 2001/0034564 A1 * | 10/2001 | Jones ....................... 360/234.3 |
| 2002/0197437 A1 * | 12/2002 | Hashimoto et al. .......... 428/64.3 |
| 2003/0096078 A1 * | 5/2003 | Horisaka et al. ............ 428/64.3 |
| 2003/0175471 A1 * | 9/2003 | Kaneko ...................... 428/66.4 |
| 2003/0210498 A1 * | 11/2003 | Kim et al. ................... 360/135 |
| 2004/0037005 A1 * | 2/2004 | Osawa ........................ 360/135 |
| 2006/0205213 A1 * | 9/2006 | Ozaki et al. .................. 438/680 |
| 2007/0269684 A1 * | 11/2007 | Machida et al. .......... 428/846.9 |

FOREIGN PATENT DOCUMENTS

| | | |
|---|---|---|
| EP | 0833309 * | 1/1998 |
| JP | 06-076282 A | 3/1994 |
| JP | 07-249223 A | 9/1995 |
| JP | 9-102122 A | 4/1997 |
| JP | 10-154321 A | 6/1998 |
| JP | 2002-100031 A | 4/2002 |

* cited by examiner

SILICON SUBSTRATE FOR MAGNETIC RECORDING MEDIUM AND MAGNETIC RECORDING MEDIUM

CROSS REFERENCE TO RELATED APPLICATIONS

This application is filed under 35 U.S.C. §111(a) claiming benefit pursuant to 35 U.S.C. §119(e) of the filing date of Provisional Application 60/614,460 on Oct. 1, 2004, pursuant to 35 U.S.C. §111(b), and claiming priority based on Japanese Patent Application No. 2004-271628, filed Sep. 17, 2004, and Japanese Patent Application No. 2005-120995, filed Apr. 19, 2005.

TECHNICAL FIELD

The present invention relates to a silicon substrate for a small-sized magnetic recording medium to be used as a recording medium of an information device, and a magnetic recording medium using the substrate.

BACKGROUND ART

In accordance with recent developments in various information devices, storage capacities of magnetic recording media have increased steadily. Particularly, magnetic disks that play a central role in the external memories of computers are increasing in both recording capacity and recording density year after year, and development of still higher-density recording has been demanded. For example, in accordance with development of laptop personal computers and palmtop personal computers, recording units that are small in size and withstand shocks have been demanded, and therefore, magnetic recording media that realize high-density recording and have high mechanical strength have been demanded. Furthermore, recently, for navigation systems and portable music reproducers, microminiature magnetic recording media have been employed.

Conventionally, as substrates for magnetic disks as magnetic recording media, an aluminum alloy substrate, a substrate formed by plating NiP on the surface of an aluminum alloy substrate, and a glass substrate have been used. However, the aluminum alloy substrate is poor in abrasion resistance and machinability, and in order to cover these defects, NiP plating is applied, but, the substrate subjected to this NiP plating has a problem in that it easily warps and becomes magnetic when it is treated at a high temperature. In addition, the glass substrate has a problem in that a deformed layer is generated and a compressive stress acts on the surface when it is reinforced, and the glass substrate easily warps when it is heated.

In the case of a microminiature magnetic recording medium with a diameter of 1 inch (27.6 mm) or 0.85 inches (21.6 mm) enabling high-density recording, substrate warp is a fatal defect. As a substrate of a microminiature magnetic recording medium, a material that is as thin as possible and does not substantially deform under external stress, and has a smooth surface for easily forming a magnetic recording layer is desirable.

Therefore, using a silicon, that has been frequently used as a semiconductor device substrate, as a substrate of a magnetic recording medium, has been proposed (for example, refer to Patent Document 1).

Monocrystalline silicon has many advantages in that it is lower in specific gravity, higher in Young's modulus, lower in coefficient of thermal expansion, and higher in high-temperature performance than aluminum, and has conductivity, and monocrystalline silicon is preferable as a substrate material for a magnetic recording medium. The smaller the diameter of the substrate, the less the shock the substrate receives, and even when a silicon substrate is used, a durable magnetic recording device is realized.

Normally, to manufacture a substrate for a magnetic recording medium, first, a monocrystalline silicon ingot is formed by a pulling method. Next, a circular through hole is fabricated at the center, and then the ingot is sliced to a predetermined thickness.

The sliced donut-shaped disk is chamfered at the edges of the central circular hole and the outer circumference with a grinding stone, and then lapping or polishing is applied to both surfaces and the surfaces are mirror-finished, and then the disk is used.

During the manufacturing process described above, the silicon substrate is transported by being housed in a transporting processing cassette, but, the material of the silicon substrate is brittle, and cracking and chipping easily occur. If the silicon substrate cracks or is chipped, this causes not only lowering in the production yield of the magnetic recording medium but also errors during recording or reproduction or crash of the magnetic head during recording or reproduction due to particles generated by rubbing against the processing cassette.

In order to obtain a substrate for a magnetic recording medium crack free and chip from a brittle material such as silicon, a method of machining ed lengths of 0.03 mm or more and 0.15 mm or less while the chamfering angles at the inner circumference and the outer circumference of the substrate are set to 20 degrees or more and 24 degrees or less has been proposed (for example, refer to Patent Document 2).

FIG. 5 shows a longitudinal sectional view of a conventional silicon substrate for a magnetic recording medium. In FIG. 5, between the main surfaces 2 and 3 of the substrate 1 and the end face 4, chamfered portions sloped at an angle α of 20 degrees or more and 24 degrees or less are provided. The lengths L of these chamfered portions are set to 0.03 mm or more and 0.15 mm or less. The same chamfered portions are also provided on the substrate inner circumferential portion although these are not shown in the figure. In this way, by using a substrate having such an outer circumferential portion shape, defects such as flaws and chipping, etc., of the substrate due to handling or dropping during the manufacturing process are reduced, and the production yield is remarkably improved.

In addition, in a glass substrate, in order to realize high-density recording, low-floating of the magnetic head with respect to the magnetic recording medium has been attempted, and recording and reproducing methods have gradually shifted from the contact start stop (CSS) method to the load/unload method (ramp loading method). In these recording and reproducing methods, a substrate with high loading reliability without errors during recording or reproduction and without crash of the magnetic head during recording or reproduction has also been demanded.

As a substrate that meets this demand, a substrate having curved portions with a radius of 0.003 mm or more and less than 0.2 mm interposed at least either between the end faces and the chamfered portions of the substrate or between the main surfaces and the chamfered portions of the substrate has been proposed (for example, refer to Patent Document 3).

A magnetic recording medium with high loading reliability without errors during recording or reproduction and without crash of the magnetic head during recording or reproduction is obtained by using this substrate.

Patent Document 1: Japanese Unexamined Patent Application, First Publication No. H06-76282

Patent Document 2: Japanese Unexamined Patent Application, First Publication No. H07-249223

Patent Document 3: Japanese Unexamined Patent Application, First

DISCLOSURE OF INVENTION

However, in the processing cassette used in the manufacturing process, the substrate end face is placed on a substrate receiving part of the cassette, and since the silicon substrate is brittle, the silicon substrate having the outer circumferential shape described in Patent document 2 or Patent document 3 allows the production of flaws or chips on the substrate end face due to shocks, and starting from these point, the substrate cracks or rubs against the processing cassette and raises dust, and the dust becomes particles and mixes into the substrate, and this becomes a the source of a defective magnetic recording medium.

Therefore, an object of the invention is to provide a substrate which is not substantially chipped or cracked on the substrate outer circumference during the manufacturing process even when the substrate is a silicon substrate made of a brittle material, and provide a silicon form of the substrate which can prevent dust from being raised from the substrate end face and dust from being raised due to rubbing against the processing cassette.

In order to solve the problem described above, the invention provides (1) A silicon substrate for a magnetic recording medium, provided with chamfered portions between main surfaces and an end face of the substrate, wherein the lengths of the chamfered portions between the main surfaces and an outer circumferential side end face are 0.1±0.03 mm, and the angles between the main surfaces and the chamfered portions between the main surfaces and the outer circumferential side end face are 45 degrees ±5 degrees.

(2) A silicon substrate for a magnetic recording medium, provided with chamfered portions between main surfaces and an end face of the substrate, wherein the lengths of the chamfered portions between the main surfaces and an inner circumferential side end face are 0.1±0.03 mm, and angles between the main surfaces and the chamfered portions between the main surfaces and the inner circumferential side end face are 45 degrees ±5 degrees.

(3) A silicon substrate for a magnetic recording medium as set forth in (1), wherein the lengths of the chamfered portions between the main surfaces and an inner circumferential side end face are 0.1±0.03 mm, and angles between the main surfaces and the chamfered portions between the main surfaces and the inner circumferential side end face are 45 degrees ±5 degrees.

(4) The silicon substrate for a magnetic recording medium as set forth in (1) or (2), wherein curved portions with a radius more than 0.01 mm and less than 0.3 mm, when viewed through a cross section of the medium, are interposed between main surfaces and chamfered portions of the substrate.

(5) The silicon substrate for a magnetic recording medium as set forth in (4), wherein the curved portions are on the outer circumferential side of the substrate.

(6) The silicon substrate for a magnetic recording medium as set forth in (4), wherein the curved portions are on the inner circumferential side of the substrate.

(7) A magnetic recording medium, wherein at least a magnetic layer is formed on the main surfaces of the silicon substrate for a magnetic recording medium as set forth in (5) or (6).

According to the invention, in a silicon substrate for a magnetic recording medium, provided with chamfered portions between the main surfaces and end faces of the substrate, the lengths of the chamfered portions between the main surfaces and the outer circumferential side end face are 0.1±0.03mm and angles between the main surfaces and the chamfered portions between the main surfaces and the outer circumferential side end face are 45 degrees ±5 degrees, so that the substrate is stably placed on a substrate receiving part in a processing cassette used in the manufacturing process, and without a chipping of the substrate end faces due to a shock, without substrate cracks from chipped starting point, and without dust raised due to rubbing against the processing cassette, the causes of defective magnetic recording media are eliminated and production yield can be improved.

DESCRIPTION OF SYMBOLS

Figure 1:
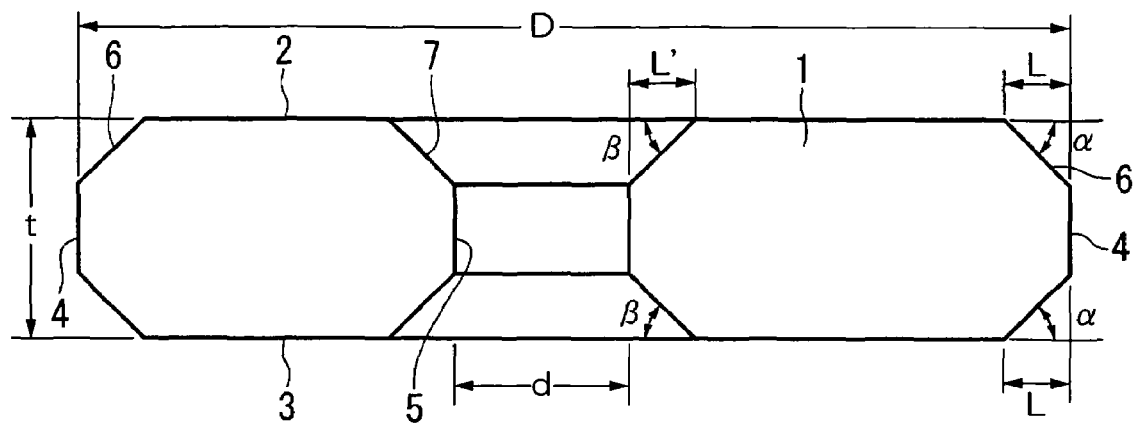
FIG. 1 is a sectional view of a silicon substrate for a magnetic recording medium of the invention.

1: silicon substrate
2, 3: main surface
4: outer circumferential end face
5: inner circumferential end face
6: outer circumference chamfered portion
7: inner circumference chamfered portion
11: frame
12: partition
13: substrate receiving part

BEST MODE FOR CARRYING OUT THE INVENTION

Hereinafter, the invention is described in detail.

FIG. 1 is a sectional view of a silicon substrate for a magnetic recording medium of the invention, cut at the center.

As shown in FIG. 1, the silicon substrate 1 for a magnetic recording medium of the invention is a donut-shaped disk, wherein main surfaces 2 and 3 for magnetic recording are formed on both surfaces of the disk, and an outer circumferential end face 4 is formed at the outermost circumference of the disk, and an inner circumferential end face 5 is formed on the inner side of the donut-shaped ring at the center of the disk. Between the main surfaces 2 and 3 and the outer circumferential end face 4, outer circumference chamfered portions 6 are formed, and between the main surfaces 2 and 3 and the inner circumferential end face 5, inner circumference chamfered portions 7 are formed.

The main surfaces 2 and 3, the outer circumferential end face 4, the inner circumferential end face 5, the outer circumference chamfered portions 6, and the inner circumference chamfered portions 7 are all polished into a mirror state.

In the silicon substrate 1 for a magnetic recording medium, the lengths L of the outer circumference chamfered portions 6 are formed to be 0.1±0.03 mm, and the angles α between the main surfaces 2 and 3 and the outer circumference chamfered portions 6 are set to 45 degrees ±5 degrees. If the lengths L of the outer circumference chamfered portions 6 exceed 0.13 mm, the area of the recording region of the main surface becomes low, and storage capacity cannot be increased. In addition, if the lengths L of the outer circumference chamfered portions 6 become smaller than 0.07 mm, the silicon substrate end faces become easy to damage when it is housed in a processing cassette.

If the angles α between the main surfaces 2 and 3 and the outer circumference chamfered portions 6 are smaller than 40 degrees, when the silicon substrate is housed in the processing cassette, extraction and housing of the silicon substrate from and into the processing cassette become unsmooth, and the substrate outer circumference easily becomes flawed. In addition, if the angles between the main surfaces 2 and 3 and the outer circumference chamfered portions 6 exceed 50 degrees, the effect of the chamfered portions is not obtained and chipping easily occurs.

Therefore, by shaping the outer circumference of the silicon substrate into a shape as described above, the substrate is stably placed on the substrate receiving part of a processing cassette, so that it becomes possible to prevent chipping of the substrate end face due to shocks and cracks of the substrate from a chipped starting point and prevent dust raising caused by rubbing against the processing cassette.

Regarding the center of the silicon substrate 1 for a magnetic recording medium, the lengths L of the inner circumference chamfered portions between the main surfaces 2 and 3 and the inner end face 5 are not especially limited in terms of substrate strength, however, it is preferable that the chamfered portion be as short as possible, and a length of approximately 0.03 mm is sufficient. The angles β between the main surfaces 2 and 3 and the inner circumference chamfered portions 7 are sufficient at 20 degrees or more.

Of course, it is also possible for the lengths L' of the inner circumference chamfered portions between the main surfaces 2 and 3 and the inner circumferential end face 5 to be set to 0.1±0.03 mm and the angles between the main surfaces 2 and 3 and the inner circumference chamfered portions 7 to be set to 45 degrees ±5 degrees.

Furthermore, in the silicon substrate 1 for a magnetic recording medium of the invention, at the intersections between the main surfaces 2 and 3 and the outer circumference chamfered portions 6 and the intersections between the outer circumferential end face 4 and the outer circumference chamfered portions 6, curved portions with a radius R of more than 0.01 mm and less than 0.3 mm, when viewed through a cross-section of the medium, are formed.

By providing the curved portions, without chipping at the corners of the silicon substrate made of a brittle material and without cracks or raising dust due to rubbing against a processing cassette, whereby the dust becomes particles and mixes in the substrate, the number of defective magnetic recording media is reduced.

The curved portions with a radius of 0.01 mm through 0.3 mm, when viewed through a cross-section of the medium, are applicable to all silicon substrates with various sizes, but, in particular, the curved portions are effective for a substrate with a diameter of 0.85 through 2.5 inches.

Figure 2:
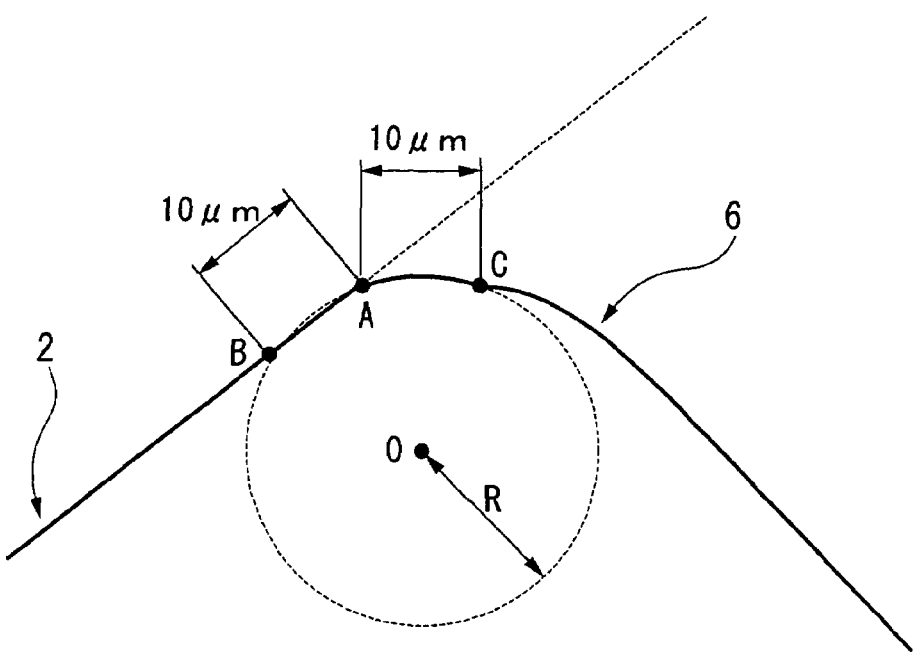
FIG. 2 shows one the method for measuring the radius R of the curved portion.

Herein, a method for measuring the radius R of the curved portion is described with reference to FIG. 2. First, an extension of the main surface is drawn, and the position at which the extension separates from the curved portion is defined as a starting point A. The position of 10 μm from the starting point A on the main surface is defined as point B, and a position on the chamfered portion at 10 μm from the starting point A is defined as point C. A radius of a circle ○ passing through the three points A, B, and C is defined as a radius R of the curved portion. When this radius R of the curved portion is set to 0.01 mm or more and 0.3 mm or less, the corners of the substrate can be prevented from being chipped. When R is less than 0.01 mm, the angle is so steep that the curved portion is weak against shocks, and in the case of handling or collision, the curved portion is easily chipped. If R exceeds 0.3 mm, the area of the main surface for recording data becomes low. Therefore, this is not preferable.

Next, a method for housing the silicon substrate for a magnetic recording medium into a processing cassette is described.

Figure 3:
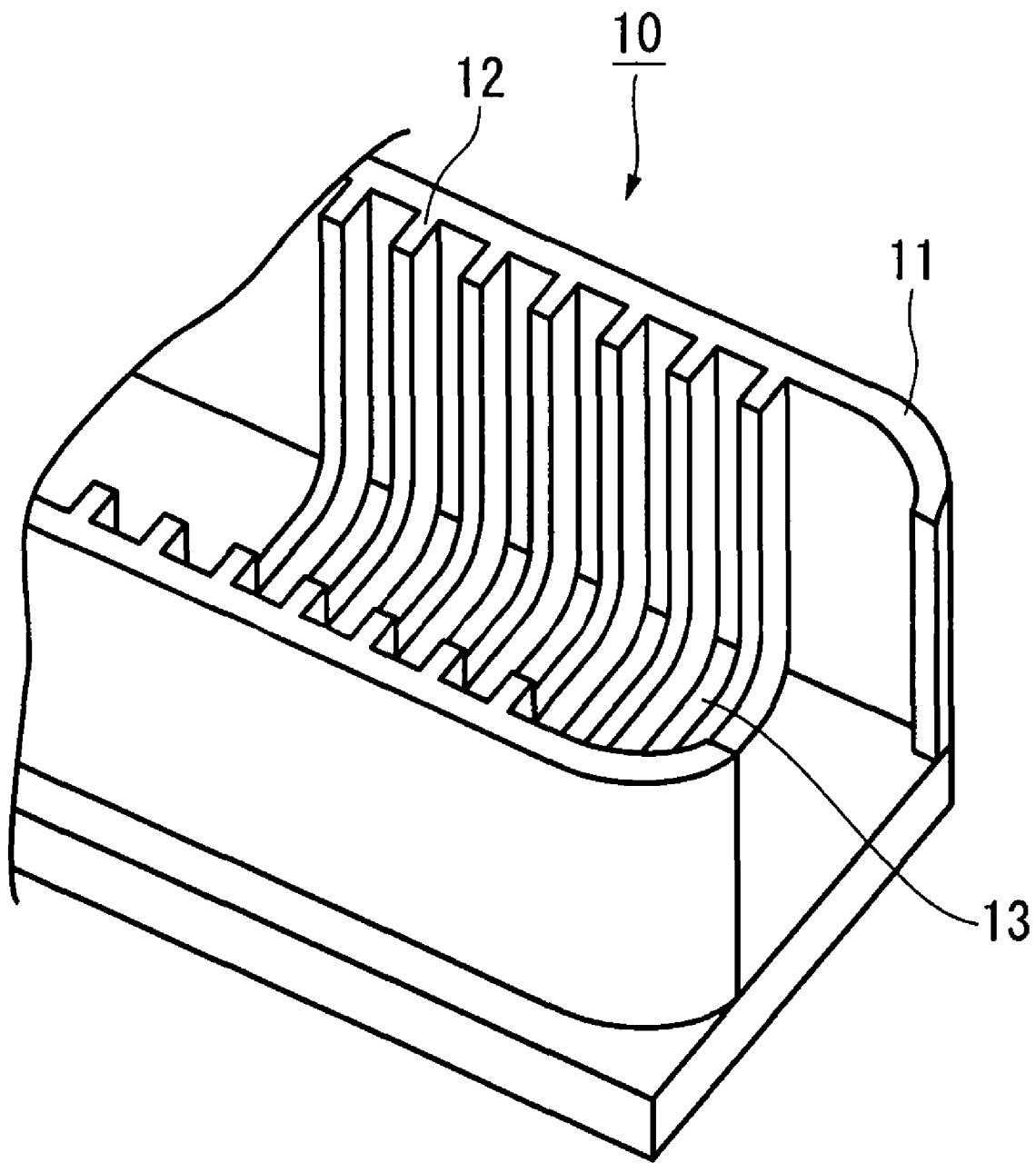
FIG. 3 is an external perspective view showing a processing cassette.

FIG. 3 is an external perspective view of a processing cassette to be used in the process of manufacturing silicon substrates for magnetic recording media. The processing cassette 10 to be used in the process of manufacturing the silicon substrates for magnetic recording media is provided with a number of partitions 12 inside a frame 11 that is made of resin and shaped like a boat so as to house silicon substrates by propping them individually. The silicon substrates are housed by being placed on substrate receiving parts 13 provided on the bottoms between the partitions 12.

Figure 4:
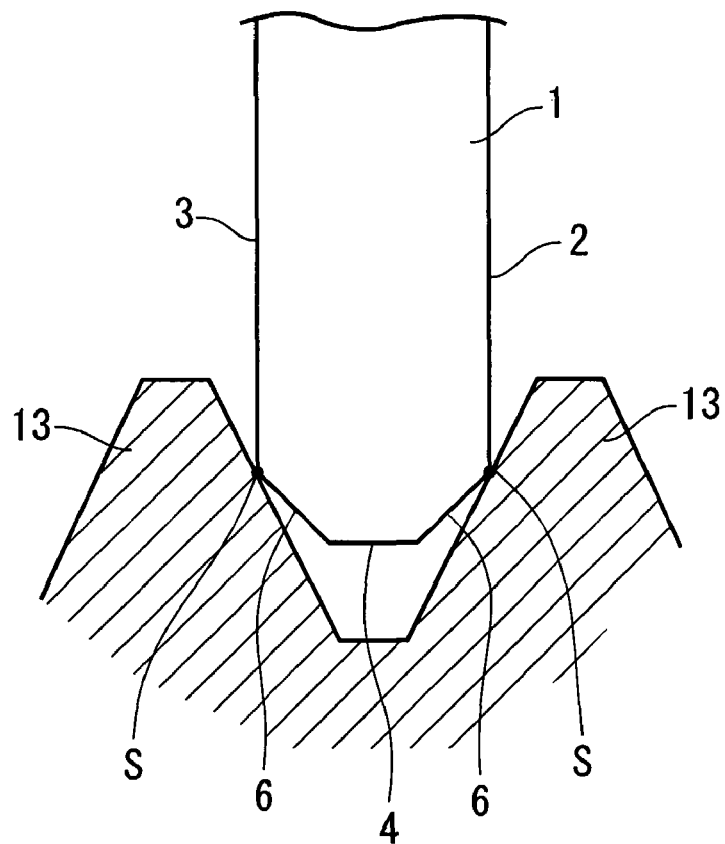
FIG. 4 is a drawing showing a condition where a silicon substrate is placed on a substrate receiving parts inside a processing cassette.
Figure 5:
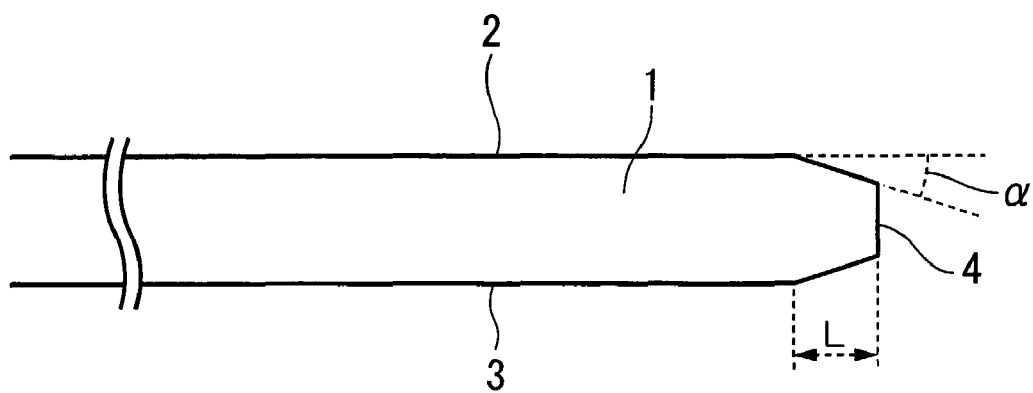
FIG. 5 is an example of a sectional view of a conventional silicon substrate for a magnetic recording medium.

FIG. 4 shows a state in which a silicon substrate 1 for a magnetic recording medium is placed on a substrate receiving parts 13 of a processing cassette. As shown in the figure, the silicon substrate 1 for a magnetic recording medium is supported by a pair of substrate receiving parts 13 and 13 at points of intersections S and S between the main surfaces 2 and 3 of the outer circumference and the outer circumference chamfered portions 6.

During manufacturing, the silicon substrate is frequently put in and taken out from the processing cassette for each process and vibration is applied during transportation of the processing cassette, so that there is a possibility that the silicon substrate outer circumference becomes flawed or chipped. Therefore, in order to prevent flaws and chipping of the silicon substrate outer circumference during manufacturing, the substrate receiving parts and the outer circumference of the silicon substrate must be shaped so as to make smooth the putting in and taking out of the silicon substrate and stably retain the silicon substrate.

Based on this standpoint, as a result of consideration of the shape of the silicon substrate outer circumference, it was found that lengths of 0.1±0.03 mm of the chamfered portions between the main surfaces and the outer circumference end face and angles of 45 degrees ±5 degrees between the main surfaces and the chamfered portions between the main surfaces and the outer circumferential end face were the most preferable.

Furthermore, it was also found that, more preferably, a curved portion with a radius of 0.01 mm or more and less than 0.3 mm was interposed between the main surfaces and the outer circumferential side chamfered portions of the silicon substrate.

In order to obtain a silicon substrate with an angle of 45 degrees ±5 degrees between the main surfaces and the chamfered portions between the main surfaces and the outer circumferential side end face, for example, the silicon substrate is ground by fitting a grindstone machined so as to obtain a predetermined angle of 45 degrees ±5 degrees while rotating the silicon substrate.

In order to obtain a silicon substrate that has an angle of 45 degrees ±5 degrees between the main surfaces and the chamfered portions between the main surfaces and the outer circumferential side end face and curved portions with a radius of 0.01 mm or more and less than 0.3 mm interposed between the main surfaces and the outer circumference chamfered portions, for example, a stacked body of silicon substrates formed by stacking a number of silicon substrates via spacers is used.

The spacers have a disk shape having a circular hole at the center like the silicon substrate, and when fitted, the end (side surface) of each spacer reaches 0 to 2 mm (preferably, 0.5 to 2 mm) inward from the edges of the outer circumference chamfered portions of the silicon substrates. The thickness of the spacer is preferably 0.1 to 0.3 mm. As a material of the spacer, a material softer than the silicon substrate, such as polyurethane, acryl, plastic, or the same material as a grinding pad to be used for grinding is preferable.

First, the outer circumference of the stacked body of silicon substrates is ground by fitting a grindstone machined so as to obtain a predetermined angle of 45 degrees ±5 degrees, and then ti is further polished with a brush.

As the polishing brush, a cylindrical brush with a diameter of 200 to 500 mm and spirally implanted bristles made of polyamide-based fibers with a fiber diameter of 0.05 mm to 0.3 mm and a fiber length of 1 to 10 mm is preferably used.

This cylindrical polishing brush is pressed against the outer circumference of the silicon substrate stacked body, and while a polishing liquid is supplied to the contact surface between the outer circumference of the silicon substrate stacked body and the polishing brush, the cylindrical brush is moved up and down to polish the outer circumferential end face of the silicon substrates while the silicon substrate stacked body is rotated at 60 rpm and the cylindrical brush is rotated at 700 to 1000 rpm in the opposite direction, whereby curved portions with a radius of 0.01 to 0.05 mm at boundary contact points between the main surfaces and the outer circumferential side chamfered portions are obtained.

The silicon substrates that have been polished with the brush are cleaned by water and the main surfaces thereof are subjected to first polishing.

The first polishing is for the purpose of removing defects and a distortions remaining after the above-described machining.

The first polishing was performed by the known in-line polisher, and a liquid (colloidal silica+water) is used as a polishing liquid, the load is set to approximately 100 gf/cm$^2$ (0.98 N/cm$^2$ (relative pressure)), the polishing removing target amount is set to 30 μm, the revolution of lower surface plate is set to 40 rpm, the revolution of upper surface plate is set to 35 rpm, the revolution of sun gear is set to approximately 14 rpm, and the revolution of internal gear is set to approximately 29 rpm.

The silicon substrates are cleaned with water and sent to the second polishing step after the first polishing step.

The polishing conditions of the second polishing as finish polishing are that a liquid (colloidal silica+water) is used as a polishing liquid, the load is set light, such as approximately 100 gf/cm$^2$ (0.98 N/cm$^2$ (relative pressure)), the polishing removing target amount is set to 5 μm, the revolution of lower surface plate is set to 40 rpm, the revolution of upper surface plate is set to 35 rpm, the revolution of sun gear is set to approximately 14 rpm, and the revolution of internal gear is set to 29 rpm.

The silicon substrates, after the second polishing step, are soaked in cleaning tanks of a neutral detergent, pure water, pure water+IPA (isopropyl alcohol), and IPA (steam dry) in order, and cleaned by ultrasonic waves.

Through the above-described processes, a silicon substrate for a magnetic recording medium is obtained in which the end faces and the chamfered portions of the substrate are mirror surfaces, the angles between the main surfaces and the chamfered portions between the main surfaces and the outer circumferential side end face are 45 degrees ±5 degrees, the lengths of the outer circumference chamfered portions are formed to be 0.1±0.03 mm, and furthermore, a curved portion with a radius of 0.01 mm or more and less than 0.3 mm is interposed between the main surfaces and the outer circumferential side chamfered portions.

The substrate, even made of a brittle silicon, for a magnetic recording medium is stably placed on substrate receiving parts in a processing cassette, and without chipping of the substrate end faces due to a shock, without substrate cracks from chipped starting point, and without dust raised due to rubbing against the processing cassette, the cause of defective magnetic recording media is eliminated and the production yield can be improved.

On both surfaces of the silicon substrate for a magnetic recording medium obtained as described above, according to a conventional method, by using, for example, a sputtering apparatus, a CrMo base layer, a CoCrPtTa magnetic layer, and a carbon hydride protective layer are formed in order, and a perfluoropolyether liquid lubricant layer is formed by a dip method, whereby a magnetic recording medium is obtained.

In the magnetic recording medium of the invention thus obtained, the angles between the main surfaces having magnetic recording layers and the chamfered portions between the main surfaces and the outer circumferential side end face are 45 degrees ±5 degrees, and the lengths of the outer circumference chamfered portions are formed to be 0.1±0.03 mm, so that the magnetic recording medium end face and the substrate do not substantially crack, dust raising from the magnetic recording medium end face is prevented, and dust raising due to rubbing with a processing cassette is prevented, so that it is effective for preventing errors during recording and reproduction and magnetic head crash during recording and reproduction.

EXAMPLE

Twenty silicon substrates with a diameter of 27.6 mm (designated: 1 inch), an inner diameter of 7 mm, and a thickness of 0.381 mm were used and subjected to first-stage lapping, the second-stage lapping, and inner and outer circumferential end face grinding, whereby the angles between the inner and outer circumference chamfered portions and the main surfaces were set to 45 degrees. Thereafter, the outer circumferential end face was polished by the method shown above. Namely, one-hundred silicon substrates were stacked via spacers made of polyurethane with a thickness of 0.2 mm, the ends (side faces) of the spacers were set approximately 1 mm inward of the edge of the outer circumference chamfered portions of the silicon substrates, and then the stacked body was polished with a brush. As the polishing brush, a cylindrical brush with a diameter of 300 mm and spirally implanted bristles made of polyamide-based fibers with a fiber diameter of 0.1 mm and a fiber length of 5 mm was used. This cylindrical polishing brush was pressed against the outer circumference of the silicon substrate stacked body, and while a polishing liquid was supplied to the contact surface between the outer circumference of the silicon substrate stacked body and the polishing brush, the polishing brush was moved up and down to polish the outer circumferential end faces of the silicon substrates while the silicon substrate stacked body was rotated at 60 rpm and the cylindrical polishing brush was rotated at 800 rpm in the opposite direction, whereby the boundary contacts between the main surfaces and the outer circumferential end face were formed into curved portions. Furthermore, first polishing and the second polishing were applied to the main surfaces, whereby silicon substrates for magnetic recording media were manufactured.

Regarding the twenty silicon substrates thus obtained, the state of damage and the condition of dust raising on the substrate end faces were investigated by applying vibrations that simulated housing and transporting the substrates in a transportation cassette.

The dust raising test using the transportation cassette was performed according to the following procedures.
1) Housing the silicon substrates in the cassette and packing it by attaching the top cover.
2) To simulate transport, moving the silicon substrates toward the bottom and the ceiling of the cassette 10 times each.
3) To simulate attachment to and detachment from the cassette, putting in and taking out the silicon substrates from the grooves of the cassette 10 times.

After finishing these processes (1), (2), and (3), the state of damage on the substrate outer circumferences was checked by observing the substrate end faces with an optical microscope, and the rate of chipping of 0.1 mm or more was investigated. In addition, the number of generated polycarbonate particles as cassette material on the substrate outer circumferences was measured by using an optical microscope. The measurement was performed by observing the twenty substrates and comparing values obtained by dividing the counted number of particles by the number (20) of substrates. These results are shown in Table 1.

TABLE 1

| Classification | Rate of chipping (%) | Number of particles (number of particles/number of substrates) |
|---|---|---|
| Example | 0.3 | 0.3 |
| Comparative example | 1.3 | 4.5 |

COMPARATIVE EXAMPLE

For comparison, a silicon substrate formed so that the angles between the main surfaces of the same substrate as in the example and the chamfered portions were set to 22 degrees and the chamfered portion lengths were set to 0.1 mm was also evaluated in the same manner. The results of this are also shown in Table 1.

From these results, it is proved that, in the case of a silicon substrate made of a brittle material, the substrate becomes a substrate that is not substantially chipped or cracked on the substrate end faces by setting the angles between the main surfaces of the substrate and the chamfered portions to 45 degrees, dust raising from the substrate end faces can be prevented, and dust raising due to rubbing with the processing cassette can also be prevented.

INDUSTRIAL APPLICABILITY

According to the invention, in a silicon substrate for a magnetic recording medium, provided with chamfered portions between the main surfaces and end faces of the substrate, the lengths of the chamfered portions between the main surfaces and the outer circumferential side end face are 0.1±0.03 mm and angles between the main surfaces and the chamfered portions between the main surfaces and the outer circumferential side end face are 45 degrees ±5 degrees, so that the substrate is stably placed on a substrate receiving part in a processing cassette used in the manufacturing process, and without a chipping of the substrate end faces due to a shock, without substrate cracks from chipped starting point, and without dust raised due to rubbing against the processing cassette, the causes of defective magnetic recording media are eliminated and production yield can be improved.

The invention claimed is:

1. A silicon substrate for a magnetic recording medium, provided with chamfered portions between main surfaces and an end face of the substrate, wherein the lengths of the chamfered portions between the main surfaces and an outer circumferential side end face are 0.1±0.03 mm, and the angles between the main surfaces and the chamfered portions between the main surfaces and the outer circumferential side end face are 45 degrees ±5 degrees,
wherein curved portions with a radius more than 0.01 mm and less than 0.3 mm, when viewed through a cross section of the medium, are interposed between main surfaces and chamfered portions of the substrate, and on both the outer circumferential sides of the substrate, and
the silicon substrate has an outer diameter ranging from 0.85 to 2.5 inches.

2. A silicon substrate for a magnetic recording medium, provided with chamfered portions between main surfaces and an end face of the substrate, wherein the lengths of the chamfered portions between the main surfaces and an inner circumferential side end face are 0.1±0.03 mm, and angles between the main surfaces and the chamfered portions between the main surfaces and the inner circumferential side end face are 45 degrees ±5 degrees,
wherein curved portions with a radius more than 0.01 mm and less than 0.3 mm, when viewed through a cross section of the medium, are interposed between main surfaces and chamfered portions of the substrate, and on both the outer circumferential sides of the substrate, and
the silicon substrate has an outer diameter ranging from 0.85 to 2.5 inches.

3. A silicon substrate for a magnetic recording medium according to claim 1, wherein the lengths of the chamfered portions between the main surfaces and an inner circumferential side end face are 0.1±0.03 mm, and angles between the main surfaces and the chamfered portions between the main surfaces and the inner circumferential side end face are 45 degrees ±5 degrees.

4. A magnetic recording medium, wherein at least a magnetic layer is formed on the main surfaces of the silicon substrate for a magnetic recording medium according to claim 1.

5. A magnetic recording medium, wherein at least a magnetic layer is formed on the main surfaces of the silicon substrate for a magnetic recording medium according to claim 2.

* * * * *